US009604310B2

(12) United States Patent
Jouanneau et al.

(10) Patent No.: US 9,604,310 B2
(45) Date of Patent: Mar. 28, 2017

(54) LASER NOZZLE HAVING AN EXTERNAL MOBILE ELEMENT

(71) Applicant: L'Air Liquide, Société Anonyme pour l'Etude et l'Exploitation des Procédés Georges Claude, Paris (FR)

(72) Inventors: Thomas Jouanneau, Grenoble (FR); Philippe Lefebvre, Meulan (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 124 days.

(21) Appl. No.: 14/441,565

(22) PCT Filed: Oct. 23, 2013

(86) PCT No.: PCT/FR2013/052533
§ 371 (c)(1),
(2) Date: May 8, 2015

(87) PCT Pub. No.: WO2014/072609
PCT Pub. Date: May 15, 2014

(65) Prior Publication Data
US 2015/0290742 A1   Oct. 15, 2015

(30) Foreign Application Priority Data
Nov. 9, 2012   (FR) ..................... 12 60656

(51) Int. Cl.
*B23K 26/14*   (2014.01)
*B23K 26/38*   (2014.01)
*B23K 26/04*   (2014.01)

(52) U.S. Cl.
CPC .......... *B23K 26/147* (2013.01); *B23K 26/048* (2013.01); *B23K 26/1464* (2013.01); *B23K 26/38* (2013.01)

(58) Field of Classification Search
CPC ....... B23K 26/14; B23K 16/147; B23K 26/38
(Continued)

(56) References Cited

U.S. PATENT DOCUMENTS 3,383,491 A   5/1968   Muncheryan
4,027,137 A * 5/1977   Liedtke ................ B23K 26/123
                                                    219/121.6
(Continued)

FOREIGN PATENT DOCUMENTS

DE   198 53 735   3/2000
EP   1 669 159   6/2006
(Continued)

OTHER PUBLICATIONS

French Search Report and Written Opinion for corresponding FR 1260656, Jul. 10, 2013.
(Continued)

*Primary Examiner* — Samuel M Heinrich
(74) *Attorney, Agent, or Firm* — Elwood L. Haynes (57) ABSTRACT

The invention relates to a nozzle for laser cutting, comprising a nozzle body (1) comprising a first axial passage (5); an external cover (13) comprising an axial housing (7), the nozzle body (1) being arranged at least partially in said axial housing (7); a movable element (3) comprising a second axial passage (4) and a front portion (3a) forming a skirt, said movable element (3) being arranged between the external cover (13) and the nozzle body (1) and being translationally movable in the axial housing (7) of the external cover (13); and an elastic element (8) arranged in the axial housing (7), between the external cover (13) and the nozzle body (1). According to the invention, the movable element (3) is able and designed to move translationally in the axial housing (7) in the direction of the first outlet orifice (14) under the effect of a gaseous pressure of said assistance gas
(Continued)

(23), said pressure being applied in said axial housing (7) and exerted on said movable element (3), said elastic element (8) exerting an elastic return force on the movable element (3) tending to oppose the translational movement of the movable element (3). Associated laser head and apparatus. Laser cutting process employing such a nozzle.

11 Claims, 4 Drawing Sheets (58) Field of Classification Search
USPC ........................................ 219/121.67, 121.84
See application file for complete search history.

(56) References Cited

U.S. PATENT DOCUMENTS

| | | | |
|---|---|---|---|
| 4,031,351 A | 6/1977 | Martin | |
| 4,733,048 A * | 3/1988 | Clayton, Jr. | B23K 26/702 |
| | | | 219/121.62 |
| 4,868,007 A * | 9/1989 | Taguchi | H01L 21/6715 |
| | | | 118/696 |
| 5,021,632 A * | 6/1991 | Hauert | B23K 26/702 |
| | | | 219/121.62 |
| 5,786,561 A | 7/1998 | Zefferer et al. | |
| 6,797,917 B1 * | 9/2004 | Yamaoku | B23K 26/0734 |
| | | | 219/121.67 |
| 8,212,176 B2 * | 7/2012 | Akiyama | B23K 26/1482 |
| | | | 219/121.67 |

FOREIGN PATENT DOCUMENTS

| | | |
|---|---|---|
| FR | 1 154 224 | 4/1958 |
| JP | S61 37393 | 2/1986 |
| JP | S62 6790 | 1/1987 |
| JP | S63 40695 | 2/1988 |
| JP | S63 108992 | 5/1988 |
| JP | H07 251287 | 10/1995 |
| JP | 2003 260852 | 9/2003 |

OTHER PUBLICATIONS

International Search Report and Written Opinion for corresponding PCT/FR2013/052533, Jan. 22, 2014.

* cited by examiner

LASER NOZZLE HAVING AN EXTERNAL MOBILE ELEMENT

CROSS REFERENCE TO RELATED APPLICATIONS

This application is a 371 of International PCT Application PCT/FR2013/052533 filed Oct. 23, 2013 which claims priority to French Patent Application No. 1260656 filed Nov. 9, 2012, the entire contents of which are incorporated herein by reference.

BACKGROUND

The invention relates to a laser nozzle usable in laser beam cutting, having a movable element comprising a skirt that allows the cutting gas to be funneled into the cutting kerf, and furthermore being easier to implement industrially.

Laser beam cutting requires the use of a nozzle, generally made of copper, that channels the gas and allows the laser beam to pass. The gas and the beam propagate as far as the part to be cut through an axial passage that passes through the body of the nozzle. These nozzles typically have outlet orifice diameters comprised between 0.5 and 3 mm for a working distance comprised between 0.6 and 2 mm.

In order to enable cutting, it is necessary to use high pressures, in general several bars, in the focusing head in order to ensure the gas penetrates into the kerf and flushes out the molten metal.

However, a large percentage of the gas used, typically between 50 and 90%, does not take part in the cutting process, i.e. in the expulsion of molten metal, because it is lost to the sides of the cutting kerf.

These gas losses are in fact due to the enormous difference between the flow cross-sectional area of the nozzle orifice and the size of the focal spot. Thus, by way of indication, the flow cross-sectional area of a nozzle with an outlet orifice of diameter equal to 1.5 mm is 25 times larger than the cross-sectional area of the focal spot created by the laser beam passing through this nozzle.

However, if an insufficient amount of gas penetrates into the kerf, cutting defects will be observed to appear, in particular attached burrs and/or oxidation marks.

Attempting to solve this problem by decreasing the diameter of the orifice of the nozzle is not ideal because the risk is then taken that the laser beam will strike and deteriorate the interior of the nozzle. Decreasing the diameter of the orifice of the nozzle moreover also decreases cutting quality and/or performance.

There are moreover a number of documents proposing various solutions that attempt to encourage gas to penetrate into the kerf, documents EP-A-1669159, JP-A-62006790, JP-A-61037393, JP-A-63108992, JP-A-63040695, U.S. Pat. No. 4,031,351, U.S. Pat. No. 3,383,491, DE 198 53 765 C1 and JP-A-2003-260582 for example.

However, none of these solutions is truly ideal because they either have an architecture that is complicated to implement, are excessively bulky relative to conventional nozzles and/or have limited effectiveness.

Document U.S. Pat. No. 3,383,491 in particular discloses a laser cutting nozzle comprising a movable element the end of which is pressed by a spring against the surface of the part to be cut in order to encourage the injection of the cutting gas into the kerf. Document DE 198 53 765 C1 also describes a spring having a similar effect.

This solution poses a certain number of problems. On the one hand, the force exerted by the spring in the direction of the sheet causes the movable element to exert a substantial force on the sheet to be cut. There is therefore a risk that the sheet will be deformed, scratched or even dragged by the movable element, as in general the sheet is simply placed on the table of the cutting machine. On the other hand, the device is complicated to implement and substantially bulkier than conventional laser nozzles. This poses a problem in the context of the cutting of imbricated parts, i.e. parts that are located very close together on a given sheet. However, this type of cutting is widely employed in the industry of laser cutting because of the material savings procured thereby.

An alternative solution has been proposed in French patent application No. 1,154,224 filed 16 May 2011 and unpublished at the date of filing of the present application. It consists in arranging a movable element in the body of a laser nozzle. This movable element is able to move axially in said body, in the direction of the surface of the sheet to be cut, under the effect of a gaseous pressure. The movable element thus moves toward the upper surface of the sheet to be cut until it makes contact therewith. The movable element thus forms a skirt that channels and concentrates the cutting gas into the kerf, thereby forcing the gas to penetrate into said kerf and improving its effectiveness.

However, this solution is not ideal because the movable element must be arranged within the very body of the laser nozzle, more precisely in the axial passage of the body of the nozzle.

Thus, there is a need to provide a solution that increases the effectiveness of the gas and that furthermore can be easily implemented via a simple modification of existing and widely commercially available laser nozzles, without modifying their internal geometry.

These conventional laser nozzles have various geometries, each model being dedicated to one type of cutting process, one type of laser beam, one type of focusing head, etc. With regard to industrial implementation, it is therefore essential to provide a solution that is compatible with most, or even all, of these nozzles.

However, the bodies of many nozzles used in the laser cutting industry do not contain a sufficient volume of material for it to be possible to arrange therein an axial housing for an internal movable element according to French patent application No. 1 154 224.

Furthermore, certain cutting applications require what are referred to as "dual flow" nozzles to be used, these nozzles comprising, in addition to an axial gas passage, at least one lateral gas passage passing through the nozzle body and arranged in proximity to said axial passage. The presence of this or these additional passages makes it difficult to machine a housing in the body of the nozzle, i.e. to widen the initial axial passage in order to allow an internal movable element to be placed therein.

Moreover, the solution consisting in arranging a movable element in the axial passage of a conventional nozzle, without widening said passage beforehand, is unsatisfactory since it decreases the space available for the passage of the focused laser beam. This results in a risk of heating or even deterioration of the internal walls of the movable element and/or the nozzle body, which would also decrease cutting performance and/or quality and the productivity of the process.

The problem addressed is thus that of how to mitigate all or some of the aforementioned drawbacks by providing a laser nozzle that especially allows the effectiveness of the gas used in laser cutting to be improved, while being much easier to implement industrially and of much improved lifespan relative to existing solutions, and that is furthermore compatible with most, even all, existing conventional laser nozzles.

SUMMARY

The solution of the present invention is thus a laser nozzle comprising:
- a nozzle body comprising a first axial passage;
- an external cover comprising an axial housing, the nozzle body being arranged at least partially in said axial housing; and
- a movable element comprising a second axial passage and a front portion forming a skirt, said movable element being arranged between the external cover and the nozzle body and being translationally movable in the axial housing of the external cover.

Depending on the case, the nozzle of the invention may comprise one or more of the following technical features:
- the axial housing of the external cover comprises a first outlet orifice located in a front face of said external cover, the movable element being able and designed to move translationally in the axial housing, in the direction of the first outlet orifice, until the front portion forming a skirt of the movable element protrudes out of the axial housing through said first outlet orifice of the axial housing.
- the nozzle body, the external cover and the movable element are axisymmetric parts arranged coaxially relative to one another, the nozzle body comprising a front portion arranged at least partially in the second axial passage of the movable element.
- the first axial passage of the nozzle body comprises a second outlet orifice located in the front portion of said nozzle body and the second axial passage of the movable element comprises a third outlet orifice located in the front portion forming a skirt of the movable element, said third outlet orifice opening downstream of said second outlet orifice when the front portion protrudes out of the axial housing.
- the movable element is able and designed to move translationally in the axial housing in the direction of the first outlet orifice under the effect of a gaseous pressure applied in said axial housing and exerted on said movable element.
- the nozzle body comprises at least one gas supply duct arranged within said nozzle body and bringing the first axial passage of the nozzle body and the axial housing of the external cover into fluidic communication.
- an elastic element is arranged in the axial housing, between the external cover and the nozzle body, said elastic element exerting an elastic return force on the movable element tending to oppose the translational movement of the movable element in the axial housing in the direction of the first outlet orifice.
- the axial housing comprises an internal shoulder, preferably arranged in the bottom of said axial housing, and the external peripheral wall of the movable element comprises an abutment arranged facing said shoulder, the elastic element being arranged between the abutment and the internal shoulder.
- the nozzle furthermore comprises a tubular element forming a sleeve about all or some of the front portion of the nozzle body, the tubular element being formed from an electrically insulating material.
- the movable element is able to move between a plurality of positions comprising:
  - a rest position in which the front portion of the movable element is completely or almost completely retracted into the axial housing; and
  - a working position in which the skirt of the front portion of the movable element completely or almost completely protrudes out of the axial housing, through the third outlet orifice.

The invention also relates to a laser focusing head comprising at least one focusing optical element, for example one or more lenses or mirrors, especially a focusing lens and a collimating lens, characterized in that it furthermore comprises a laser nozzle according to the invention.

Moreover, the invention also relates to a laser apparatus comprising a laser generator, a laser focusing head and a laser beam guiding device connected to said laser generator and to said laser focusing head, characterized in that the laser focusing head is according to the invention.

Preferably, the generator or laser source is a $CO_2$, YAG, fiber or disk laser, preferably a fiber or disk laser and especially a ytterbium fiber laser source.

According to another aspect, the invention also relates to a laser beam cutting process, which employs a nozzle according to the invention, a laser focusing head according to the invention or an apparatus according to the invention.

BRIEF DESCRIPTION OF THE DRAWINGS

The invention will now be better understood by virtue of the following description given with reference to the appended figures, in which.

DESCRIPTION OF PREFERRED EMBODIMENTS

Figure 1A:
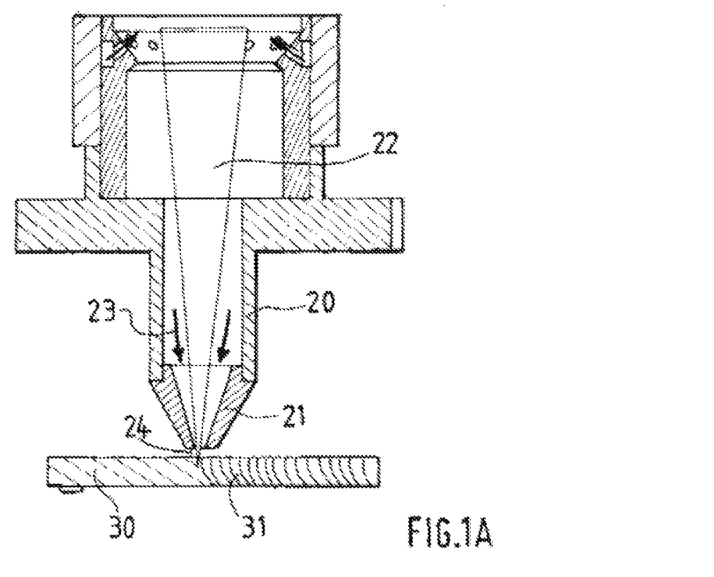
FIG. 1A schematically shows a focusing head of a conventional laser cutting apparatus.

FIG. 1A shows the focusing head 20 of a conventional laser cutting apparatus, to which a conventional laser nozzle 21 is fastened, said nozzle being passed through by a focused laser beam and by the assistance gas (arrow 23) that serves to expel metal melted by the beam out of the cutting kerf 31 formed by the beam 22 in the metal part 30 to be cut, for example a sheet of steel or stainless steel.

The assistance gas may be an active gas, such as oxygen, air, $CO_2$ or hydrogen, or an inert gas such as argon, nitrogen or helium, or a mixture of a number of these active and/or inert gases. The composition of the gas is especially chosen depending on the nature of the part to be cut.

The beam, which is made to impact the part, will melt, at this point of impact, the metal, which will be expelled under the part by the pressure of the assistance gas.

Figure 1B:
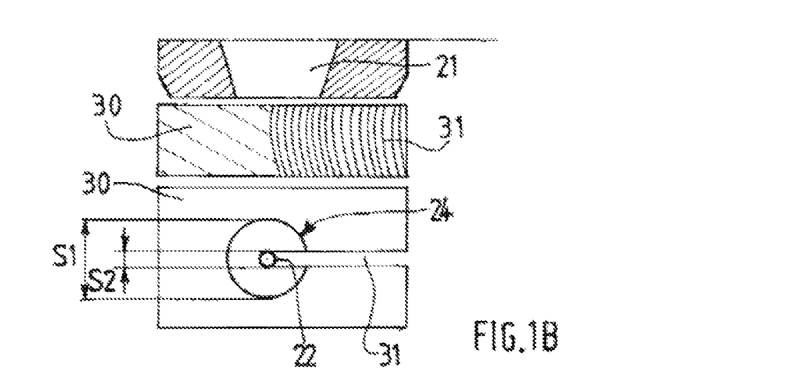
FIG. 1B schematically shows the size of the laser spot relative to the size of the nozzle orifice.

FIG. 1B shows the flow cross-sectional area S1 of the orifice 24 of the nozzle 21 relative to the size S2 of the focal spot of the beam 22. As may be seen, the area S1 is very much larger than the size S2 of the focal spot of the beam 22, leading, in conventional nozzles, to a high consumption of assistance gas, only a small proportion of which will serve to expel the molten metal from the cutting kerf 31.

To avoid having to arrange an internal movable element inside the body of the conventional laser nozzle in FIG. 1A, more precisely in the axial passage of said nozzle, the present invention provides a laser nozzle having an external movable element.

Figure 2:
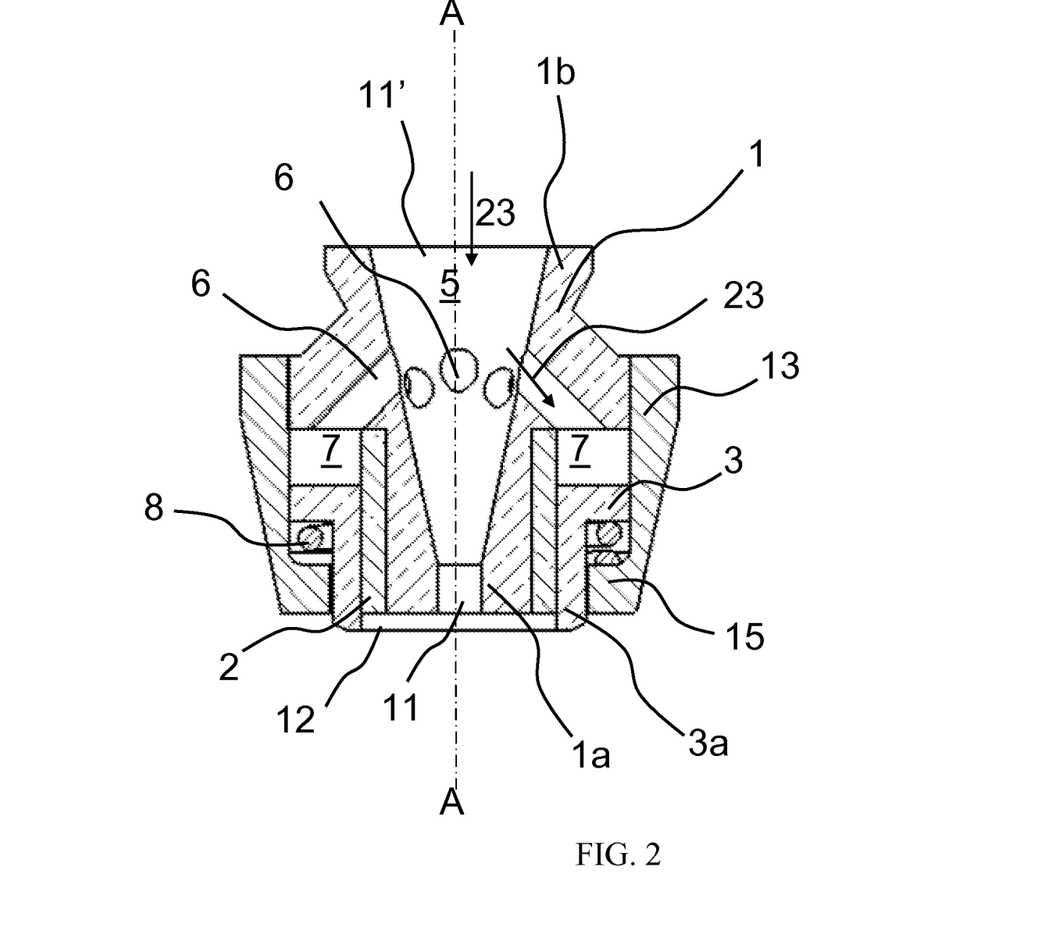
FIG. 2 shows a schematic cross-sectional view of a nozzle according to one embodiment of the invention.
Figure 3A:
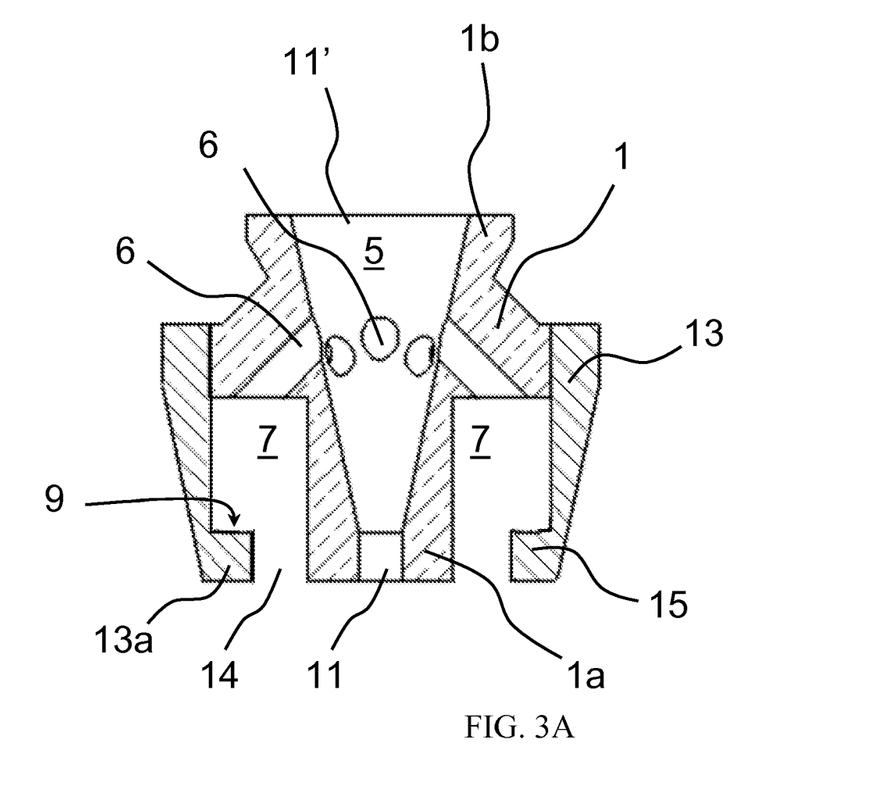
FIGS. 3A and 3B show schematic cross-sectional views of certain constituent elements of a nozzle according to one embodiment of the invention.
Figure 3B:
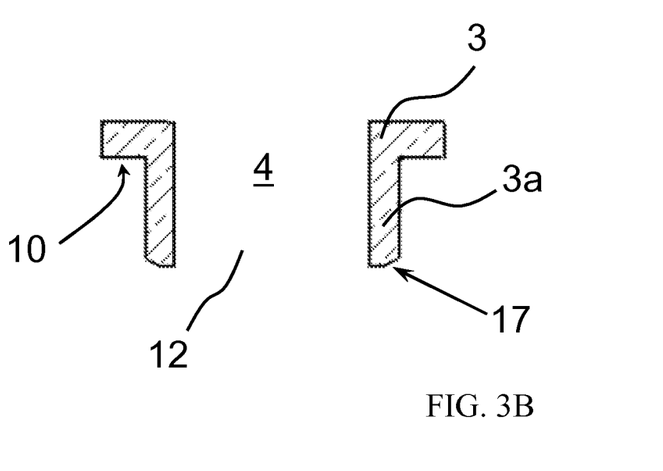

In fact, the laser nozzle of the invention, shown in FIG. 2, comprises a nozzle body 1 and an external cover 13, shown in FIG. 3A, interacting with a movable element 3 movably arranged about at least one portion of the body 1 of the nozzle. A movable element 3 according to the invention is schematically shown in FIG. 3B.

More precisely, the nozzle body 1, preferably formed from a conductive material, for example of copper or brass, is intended to be fastened to the laser focusing head 20 of the laser apparatus.

Advantageously, the nozzle body 1 is an axisymmetric part through which a first axial passage 5 of the axis of symmetry AA passes from side to side, said passage 5 extending from the back portion 1b of the body 1 as far as the front portion 1a of said body 1.

In the context of the invention, the expressions "front face" and "front portion" are understood to mean those portions of the elements of the laser nozzle which are located on the side of the sheet to be cut when the nozzle is being used. The portions or faces opposite being designated by the term "back".

The first axial passage 5 emerges from the two, front and back, portions 1a and 1b of the nozzle body 1. The back portion 1b therefore contains a second inlet orifice 11', whereas the front portion 1a contains a second outlet orifice 11 of the nozzle body 1, the second inlet and outlet orifices 11', 11 being coaxial and of axis AA.

This first axial passage 5 is in fact a void, that may be various shapes, for example generally cylindrical or frustoconical in shape, the cylindrical outlet channel possibly being convergent-divergent, i.e. of "De Laval" geometry, or any other geometry.

The second outlet orifice 11 is preferably circular in cross section and of a diameter preferably comprised between 0.5 and 5 mm.

The external cover 13 comprises an axial housing 7 in which the nozzle body 1 is at least partially arranged, preferably coaxially with said body 1. As may be seen in FIG. 3A, the axial housing 7 passes right through the external cover 13 and especially comprises a first outlet orifice 14 located in the front face 13a of the external cover 13.

Advantageously, the external cover 13 comprises a bottom 15 comprising an internal shoulder 9 projecting radially toward the centre of the housing 7, said internal shoulder 9 being formed by a narrowing 15 of the cross section of the axial housing 7 in the first outlet orifice 14.

According to the invention, the nozzle moreover comprises a movable element 3 that is inserted into the axial housing 7 of the external cover 13, between the external cover 13 and the nozzle body 1. This movable element 3 is able and designed to move translationally along the axis AA inside the first housing 7 of the external cover 13, until the front portion 3a forming a skirt of the movable element 3 protrudes out of said housing 7, as shown in FIG. 2, through the first outlet orifice 14.

As may be seen in FIG. 3B, the movable element 3 is advantageously an axisymmetric part comprising a front portion 3a forming a skirt of generally cylindrical shape, i.e. tubular. The movable element 3 furthermore comprises a second axial passage 4 having a second outlet orifice 12 emerging from the front portion 3a forming a skirt.

More precisely, when the front portion 3a of the movable element 3 protrudes out of the axial housing 7, the third outlet orifice 12 of the movable element 3, which is preferably of circular cross section, opens downstream of the second outlet orifice 11 of the nozzle body 1.

The external peripheral wall of the movable element 3 advantageously comprises an abutment 10, arranged facing the internal shoulder 9 when the movable element 3 is arranged in the axial housing 7.

Preferably, the movable element 3, the nozzle body 1 and the external cover 13 are each parts of unitary construction and are arranged coaxially relative to one another. In other words, the axes of symmetry of the movable element 3 and of the external cover 13 are coincident, or substantially coincident, with the axis AA of the nozzle body 1.

Advantageously, the front portion 1a of the nozzle body 1 is arranged at least partially in the second axial passage 4 of the movable element 3. The movable element 3 may move axially along the external peripheral wall of said front portion 1a of the nozzle body 1. The second axial passage 4 of the movable element 3 and the external peripheral wall of the front portion 1a preferably have cylindrical profiles.

According to the invention, the movable element 3 is therefore an external element arranged about at least one portion of the front portion 1a of the nozzle body 1, i.e. outside the nozzle body 1 and not therein.

Preferably, the movable element 3 is able to move translationally in the axial housing 7 in the direction of the first outlet orifice 14 under the effect of a gaseous pressure applied in the axial housing 7 and exerted on said movable element 3. The movable element 3 is advantageously maintained at least partially in the housing 7 by virtue of the abutment 10 and the shoulder 9.

According to one particularly advantageous embodiment of the invention, illustrated in FIGS. 2 to 4, 5A and 5B, the nozzle body 1 comprises at least one gas supply duct 6 arranged within said nozzle body 1 and bringing the first axial passage 5 of the nozzle body 1 and the axial housing 7 of the external cover 13 into fluidic communication. Preferably, the nozzle body 1 comprises from one to twenty ducts 6 and preferably from three to eight ducts 6, passing through said body 1. These ducts 6 are preferably voids, or bores, produced in the body 1, again preferably of circular cross section, and of a diameter that may be about 0.5 to 5 mm.

In fact, the nozzle of the invention is intended to equip a focusing head mounted in an industrial laser cutting apparatus. This type of apparatus conventionally comprises at least one source of assistance gas connected to at least one line. This line is able and designed to supply the focusing head, and more precisely the internal volume of said head, with gas.

The laser nozzle is fluidically connected to the focusing head by way of the inlet orifice 11', which brings the internal volume of the focusing head and the first axial passage 5 of the nozzle body 1 into fluidic communication. In this way, the cutting gas 23 which supplies the focusing head is distributed through the laser nozzle according to the invention.

Advantageously, the movable element 3 of the nozzle is able and designed to move translationally in the housing 7 of the external cover 13 when the gas source supplies the focusing head and the axial passage 5 of the laser nozzle with gas. The gas 23 then exerts a gaseous pressure on said movable element 3, which induces a movement of said element 3 in the housing 7.

In fact, during use of the nozzle according to the invention, the laser beam 22 and the assistance gas 23 pass through the first axial passage 5 of the nozzle body 1 and exit via the second outlet orifice 11, which is located in the front portion 1a of the body 1.

As may be seen in FIG. 2, when the gas 23 is supplied to the first axial passage 5 of the nozzle body 1, some of the gas distributed in the first axial passage 5 also supplies the one or more gas supply ducts 6.

The ducts 6 play the role of bypass ducts and distribute at least some of said gas 23 to the axial housing 7 of the external cover 13, so that a gaseous pressure is applied in the axial housing 7 and exerted on the movable element 3.

The movable element 3 thus moves axially relative to the body 1 of the nozzle and to the external cover 13 under the effect of the pressure of the assistance gas 23, which tends to push it in the direction of the part 30 to be cut. The translational movement along the axis AA of the movable element 3 will cause the skirt 3a to move closer to the upper surface 30 of the sheet to be cut, which will make contact with each other, as illustrated in FIG. 6B.

Thus, the gas will be channeled by the skirt 3a and concentrated on the laser spot and therefore the kerf, thereby greatly improving its effectiveness and the expulsion of metal.

Advantageously, an elastic element 8, such as a spring, is arranged in the axial housing 7 between the external cover 13 and the nozzle body 1, so as to exert an elastic return force on the movable element 3 in a direction tending to distance it from the part 30 to be cut. In other words, the elastic return force exerted by the element 8 tends to oppose the translational movement of the movable element 3 in the direction of the first outlet orifice 14.

In the context of the invention, the elastic element 8 is arranged in the axial housing 7, between the external cover 13 and the nozzle body 1, and preferably between the shoulder 9 and the abutment 10.

Thus, at the end of the cutting, when the gas is cut off and the gaseous pressure ceases to be exerted on the movable element 3, the latter may be returned to its rest position, i.e. until the skirt 3a has retracted into the housing 7.

The elastic element 8 thus allows effects causing wear of the skirt 3a to be limited during phases of piercing of the sheet, which generally precede the cutting phases. Specifically, this piercing is most often carried out under low gas pressures, typically lower than 4 bar. The elastic element then exerts enough of a return force for the skirt 3a to retract completely or almost completely into the housing 5, and it is thus protected from molten-metal spatter generated by the piercing.

The elastic element 8 also makes it easier to rapidly move the cutting head small distances over the sheet, without cutting gas or beam, since the gaseous pressure then ceases to be exerted on the movable element and the skirt 3a retracts into the housing 7. Only the skirt 3a is withdrawn and it is not necessary to raise the focusing head supporting the nozzle.

Furthermore, the elastic element 8 makes it possible to limit the pressure exerted by the movable element 3 on the part to be cut when said element is moved in the direction of the part under the effect of the cutting gas. More precisely, the return force of the elastic element 8 is advantageously chosen so as to hold the movable element 3 in contact with the part to be cut while limiting the pressure that said element exerts on the sheet.

This makes it possible to minimize greatly, or even eliminate, any risk of deforming the sheet in which the part is cut, of scratching the surface of the sheet, and of dragging the sheet.

The movable element 3 may be formed from an electrically insulating material, preferably a ceramic such as $Al_2O_3$, AlN, $ZrO_2$ or $Al_2TiO_5$, or a polymer, for example polyetheretherketone (PEEK) or Vespel®, or Pyrex. The expression "electrically insulating material" is understood to mean a material that does not conduct electricity, i.e. a material that prevents the passage of electrical current between two electrically conductive elements.

Alternatively, the movable element 3 may be formed from an electrically conductive material, for example a metallic material such as steel, bronze or graphite.

When the movable element 3 is formed from an electrically insulating material, the external cover 13 is formed from an electrically conductive material, and vice versa.

Optionally, the front portion 3a of the insert 3 may comprise a downstream end portion 17 the outside diameter of which gradually decreases in the direction of the third outlet orifice 12. Thus, the front portion 3a is shaped so as to facilitate its passage over reliefs or obstacles present on the surface of the sheet.

The expression "downstream end portion" is understood to mean a segment of the front portion 3a located at the downstream end of said front portion, i.e. facing the upper surface of the sheet to be cut.

The downstream end portion is thus shaped to pass over a step or obstacle without or with a greatly decreased impact on the skirt 3a, and without or else with very little decrease in the velocity of the nozzle. The presence of a sharp edge on the end of the front portion 3a is also avoided, thereby making the movement of the skirt of the invention more flexible and allowing it to follow variations in levels that may be present on the surface of the sheet to be cut, thereby making it even easier to implement industrially.

In the context of the invention, the downstream end segment 17 may comprise at least one chamfer making an angle $\alpha$ comprised between 0.1 and 80° and preferably between 10 and 45° to the front face of the front portion 1a of the nozzle body 1.

Alternatively, the external profile of the downstream end segment 17 may comprise at least one curvilinear segment, preferably at least one convex segment. The radius of curvature of the at least one convex segment is typically comprised between 0.1 and 2 mm.

Optionally, the nozzle according to the invention may comprise a tubular element 2 forming a sleeve about all or some of the front portion 1a of the nozzle body 1, the tubular element 2 being formed from an electrically insulating material such as polyetheretherketone (PEEK), Vespel®, or an electrically insulating ceramic.

This embodiment is particularly advantageous when the movable element 3 is formed from an electrically conductive material, the tubular element 2 making it possible to prevent any electrical contact being made between the movable element 3 and the nozzle body 1. Thus, failure of the capacitive distance sensing systems with which industrial laser cutting machines are equipped to ensure that the focusing head is moved at a constant distance above the sheet to be cut, is prevented.

Figures 4, 5A, 5B:
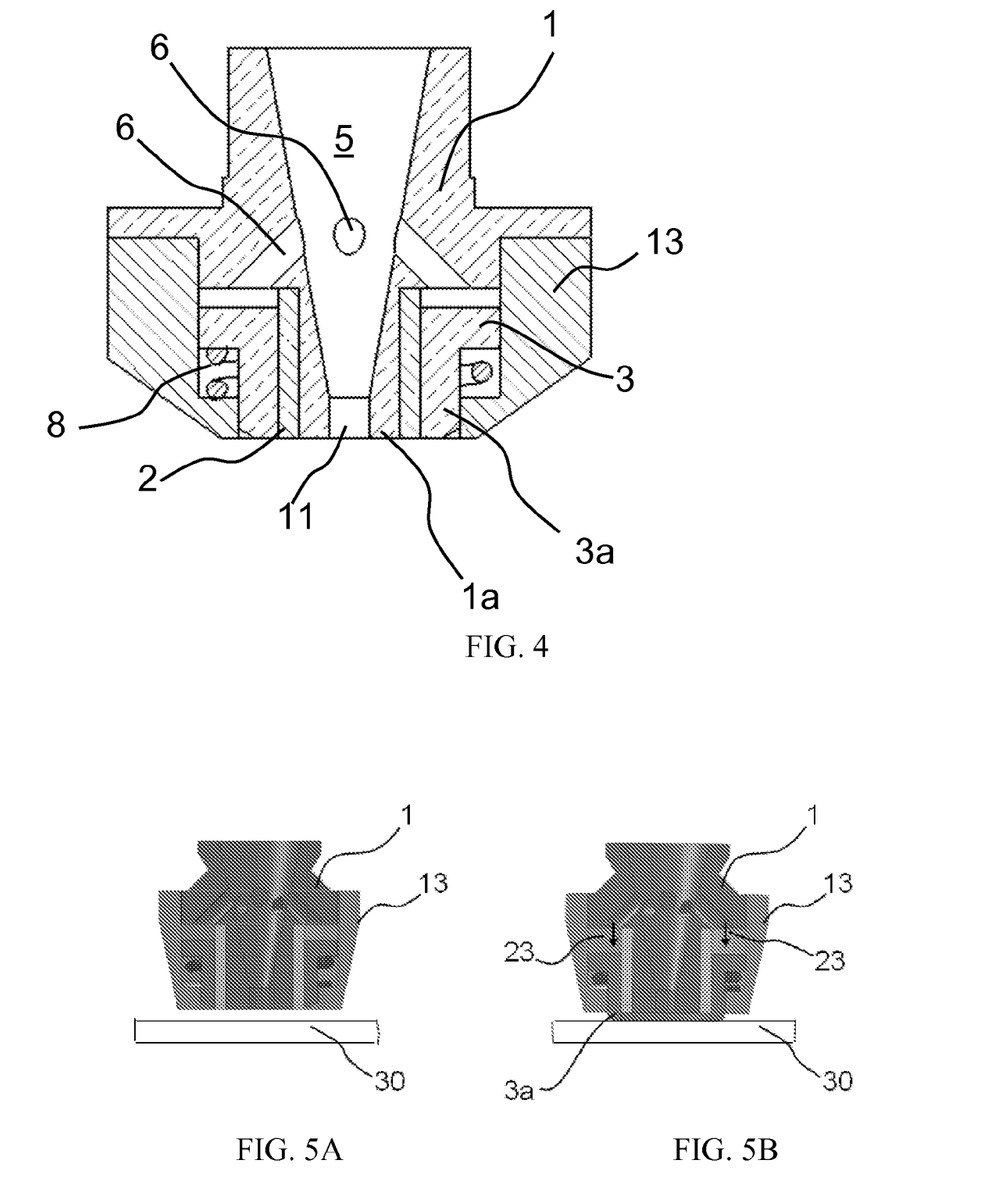
FIG. 4 shows a schematic cross-sectional view of a nozzle according to another embodiment of the invention, the movable element occupying a different position to that shown in FIG. 2.
FIGS. 5A and 5B schematically show a nozzle according to the invention in operation, the movable element occupying two different positions.

FIG. 4 illustrates another embodiment of the invention in which the geometry of the nozzle body 1 and the external cover 13 is substantially different to the embodiment in FIG. 2, but the operating principle of which is identical.

FIGS. 5A and 5B schematically show a translational movement of the movable element 3 under the effect of a gas pressure 23.

In particular, FIG. 5A schematically shows a nozzle according to the invention comprising a movable element 3 the front portion 3a of which is retracted into the axial housing 7. FIG. 5B schematically shows the effect of a gaseous pressure 23 applied in the housing 7 and exerted on the movable element 3, the latter moving until the front portion 3a forming a skirt protrudes out of the first housing 7.

In fact, the movable element 3 of the nozzle according to the invention is able to move between a plurality of positions, comprising at least:
 a rest position in which the skirt 3a is completely or almost completely retracted into the axial housing 7 of the external cover 13, as illustrated in FIG. 5A; and
 a working position in which the skirt 3a completely or almost completely protrudes out of the axial housing 7 of the external cover 13, through the first outlet orifice 14, and makes contact with the part 30 to be cut, as illustrated in FIG. 5B.

Of course, the movable element 2 may occupy intermediate positions in which the skirt 3a only partially protrudes out of the axial housing 7. These intermediate positions may especially depend on the pressure in the axial housing 7 and exerted on the movable element 3.

The present invention therefore provides a laser nozzle able and designed for cutting with a laser beam with a lower gas flow and/or gas pressure, its particular nozzle architecture forcing a larger proportion of the gas to penetrate into the kerf and to expel effectively the molten metal therefrom, whatever the laser power and the wavelength of the beam.

As may be seen in FIGS. 2 to 4, the nozzle of the invention is of standard bulk, i.e. its bulk is no larger than that of a conventional cutting nozzle, which is advantageous and compatible with imbricated cutting, i.e. of parts in a given sheet with very little space separating the various parts.

In addition, the nozzle of the invention has the major advantage of being compatible with most laser nozzles currently used in the industry, even those the body of which is smaller in size, since it is no longer necessary to provide an axial housing to receive the movable element within the very body of the nozzle. The solution of the present invention thus provides a laser nozzle having a movable element external to the nozzle body, industrial implementation of which is easier.

EXAMPLES

In order to demonstrate the effectiveness of the nozzle according to the invention relative to a standard nozzle, i.e. a conventional nozzle without a movable element, and therefore the advantage of using a skirt mounted on a movable element to force gas into the cutting kerf, comparative trials were carried out using a cutting apparatus employing a $CO_2$ laser generator to generate a laser beam that was directed to a focusing laser head comprising focusing optical elements, namely lenses.

The focusing laser head was equipped either with a standard nozzle with an outlet orifice of 1.8 mm diameter, or a nozzle according to FIG. 2 with a movable skirt, the axial passage of the nozzle body of the latter nozzle having an outlet orifice of 1.8 mm diameter.

The assistance gas used was nitrogen.

The sheet to be cut was a 5 mm-thick sheet of 304L stainless steel.

The laser beam had a power of 4 kW and the cutting speed was 2.6 m/min.

The results obtained demonstrated that:
 with the standard nozzle, a gas pressure of 14 bars is not enough to obtain a quality cut. Specifically, at 14 bars, the edges of the cut contain many attached burrs. This demonstrates that the evacuation of the molten metal has not taken place as it should because of an insufficient action of the gas on the molten metal needing to be expelled. In order to remove these burrs, a pressure of 16 bars was required;
 with the nozzle of the invention, trials carried out at pressures ranging between 1 and 5 bars led to good-quality cuts, i.e. having cut edges devoid of attached burrs. The skirt of the nozzle allowed gas to be channeled into the kerf and the molten metal to be effectively expelled. Furthermore, the nozzle permitted operation of the capacitive sensor and it was possible to keep the distance between the front portion of the nozzle body and the upper surface of the sheet constant throughout the cutting process.

These trials clearly demonstrate the effectiveness of a nozzle according to the invention, which allows the gas pressures implemented to be considerably decreased relative to a standard nozzle, under otherwise identical conditions, and therefore gas consumption to also be decreased.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A laser nozzle comprising:
 a nozzle body comprising a first axial passage and an inlet orifice allowing said first axial passage to be supplied with assistance gas;
 an external cover comprising an axial housing and a first outlet orifice located in a front face of said external cover, the nozzle body being arranged at least partially in said axial housing;
 a movable element comprising a second axial passage and a front portion forming a skirt, said movable element being arranged between the external cover and the nozzle body and being translationally movable in the axial housing of the external cover; and
 an elastic element arranged in the axial housing, between the external cover and the nozzle body,
wherein the movable element is able and designed to move translationally in the axial housing in the direction of the first outlet orifice under the effect of a gaseous pressure of said assistance gas, said pressure being applied in said axial housing and exerted on said movable element, said elastic element exerting an elastic return force on the movable element tending to oppose the translational movement of the movable element in the axial housing in the direction of the first outlet orifice.

2. The nozzle of claim 1, wherein the movable element is able and designed to move translationally in the axial housing in the direction of the first outlet orifice, until the front portion forming a skirt of the movable element protrudes out of the axial housing through said first outlet orifice of the axial housing.

3. The nozzle of claim 1, wherein the nozzle body, the external cover and the movable element are axisymmetric parts arranged coaxially relative to one another, the nozzle body comprising a front portion arranged at least partially in the second axial passage of the movable element.

4. The nozzle of claim 1, wherein the first axial passage of the nozzle body comprises a second outlet orifice located in the front portion of said nozzle body and the second axial passage of the movable element comprises a third outlet orifice located in the front portion forming a skirt of the movable element, said third outlet orifice opening downstream of said second outlet orifice when the front portion protrudes out of the axial housing.

5. The nozzle of claim 1, wherein the nozzle body comprises at least one gas supply duct arranged within said nozzle body and bringing the first axial passage of the nozzle body and the axial housing of the external cover into fluidic communication.

6. The nozzle of claim 1, wherein the axial housing comprises an internal shoulder, and the external peripheral wall of the movable element comprises an abutment arranged facing said internal shoulder, the elastic element being arranged between the abutment and the internal shoulder.

7. The nozzle of claim 1, further comprising a tubular element forming a sleeve about all or some of the front portion of the nozzle body, the tubular element being formed from an electrically insulating material.

8. The nozzle of claim 1, wherein the movable element is able to move between a plurality of positions comprising:
   a rest position in which the front portion of the movable element is completely or almost completely retracted into the axial housing; and
   a working position in which the skirt of the front portion of the movable element completely or almost completely protrudes out of the axial housing, through the third outlet orifice.

9. A laser focusing head comprising at least one focusing optical element, further comprising a laser nozzle as claimed in claim 1.

10. A laser apparatus comprising a laser generator, a laser focusing head and a laser beam guiding device connected to said laser generator and to said laser focusing head, wherein the laser focusing head is as claimed in claim 9.

11. The apparatus as claimed in claim 10, further comprising a gas source and at least one gas supply line fluidically connecting the focusing head and said gas source, the first passage of the laser nozzle body being fluidically connected to the focusing head, and the movable element moving translationally in the axial housing of the nozzle body when the gas source supplies the focusing head and the laser nozzle.

* * * * *